US 8,714,522 B2

(12) United States Patent
Hasegawa et al.

(10) Patent No.: US 8,714,522 B2
(45) Date of Patent: May 6, 2014

(54) FLUID CONTROL VALVE

(75) Inventors: Motonobu Hasegawa, Kariya (JP);
Masato Ishii, Kariya (JP); Yusuke Yoshida, Kitanagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 109 days.

(21) Appl. No.: 13/099,757

(22) Filed: May 3, 2011

(65) Prior Publication Data

US 2011/0308640 A1    Dec. 22, 2011

(30) Foreign Application Priority Data

Jun. 17, 2010    (JP) ................................. 2010-138384

(51) Int. Cl.
*F16K 1/22*    (2006.01)
*F02D 9/10*    (2006.01)

(52) U.S. Cl.
USPC ............................ 251/306; 251/175; 123/337

(58) Field of Classification Search
USPC ............ 251/85, 88, 173, 175, 192, 305, 306, 251/307, 308; 123/337
See application file for complete search history.

(56) References Cited

U.S. PATENT DOCUMENTS

| | | | | |
|---|---|---|---|---|
| 2,923,523 A | * | 2/1960 | Taylor | 251/175 |
| 3,457,849 A | * | 7/1969 | Hinden | 454/333 |
| 3,606,245 A | * | 9/1971 | Reichow et al. | 251/306 |
| 4,193,605 A | * | 3/1980 | Josephson | 277/642 |
| 5,499,947 A | | 3/1996 | Tauber | |
| 6,412,755 B2 | * | 7/2002 | Ito | 251/173 |
| 6,540,604 B1 | * | 4/2003 | Parekh et al. | 454/121 |
| 6,722,335 B2 | | 4/2004 | Nomura et al. | |
| 7,392,826 B2 | * | 7/2008 | Schub et al. | 137/601.17 |
| 2001/0014582 A1 | | 8/2001 | Ito | |
| 2005/0109970 A1 | | 5/2005 | Masui et al. | |
| 2008/0073605 A1 | | 3/2008 | Ishigaki et al. | |

FOREIGN PATENT DOCUMENTS

| | | |
|---|---|---|
| DE | 102004050094 A1 | 5/2005 |
| FR | 2918145 A1 | 1/2009 |
| JP | S52-075119 U | 6/1977 |
| JP | S53-057524 A | 5/1978 |
| JP | S55-161170 U | 11/1980 |
| JP | H04-312270 A | 4/1992 |
| JP | H05-280379 A | 10/1993 |

(Continued)

OTHER PUBLICATIONS

European Search Report issued by European Patent Office on Oct. 9, 2013 in European Application No. 11166709.3 (8 PGS).

(Continued)

*Primary Examiner* — John K Fristoe, Jr.
*Assistant Examiner* — Jonathan Waddy
(74) *Attorney, Agent, or Firm* — Buchanan Ingersoll & Rooney P.C.

(57) ABSTRACT

A fluid control valve, which includes a body forming a fluid passage and including a sealing surface positioned in the fluid passage, a valve body configured to rotate between an open position and closed position within the fluid passage, an elastic sealing member provided at a rim portion of the valve body, and a lip portion extended from the elastic sealing member to be directed towards a center portion of the valve body. The lip portion contacts the sealing surface and a surface of the lip portion facing the sealing surface is exposed to the fluid passage.

14 Claims, 3 Drawing Sheets

(56) References Cited

FOREIGN PATENT DOCUMENTS

| | | |
|---|---|---|
| JP | H07-279696 A | 10/1995 |
| JP | 2003-184582 A | 7/2003 |
| JP | 2008-075827 A | 4/2008 |

OTHER PUBLICATIONS

Official Action issued by Japanese Patent Office on Feb. 20, 2014 in Japanese Application No. 2010-138384, and English language translation of Official Action (9 pgs).

* cited by examiner

FLUID CONTROL VALVE

CROSS REFERENCE TO RELATED APPLICATIONS

This application is based on and claims priority under 35 U.S.C. §119 to Japanese Patent Application 2010-138384, filed on Jun. 17, 2010, the entire content of which is incorporated herein by reference.

TECHNICAL FIELD

This disclosure relates to a fluid control valve.

BACKGROUND DISCUSSION

A known fluid control valve is disclosed in JP2003-184582A (see paragraphs [0014], [0015] and FIGS. 1 and 4) (i.e., hereinafter referred to as Patent reference 1). The fluid control valve disclosed in the Patent reference 1 is attached to a surge tank mounted to an intake system for a V-type multiple-cylinder engine. The surge tank is separated into two surge spaces by a partition wall. Odd numbered cylinders are provided to extend from one of the surge spaces and even numbered cylinders are provided to extend from the other of the surge spaces. A part of the partition wall is open to serve as a fluid passage. By operating a valve body by an actuation of an actuator to rotate between an open position and a closed position, a resonance frequency of the intake system is changed to attain supercharging effects in a wide engine driving range. In a case where an engine is operated in a state where the valve body is at the closed position, a pressure is alternately generated in the surge spaces which are separated by the partition wall because each cylinder sucks the air in a predetermined order. However, if a fluid leaks when the valve is at the closed position in those circumstances, the intake system cannot attain an expected resonance frequency, thereby degrading the supercharging effects.

Figure 8:
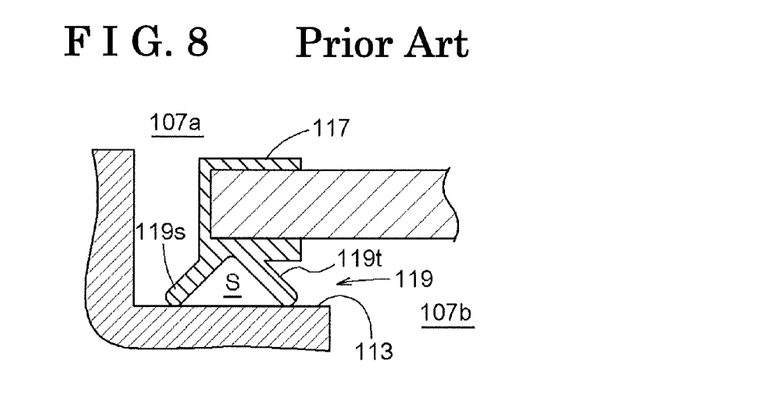
FIG. 8 is a schematic plan view illustrating a main portion of a known fluid control valve.

As shown in FIG. 8, an elastic sealing member 117 of the fluid control valve disclosed in the Patent reference 1 includes a lip portion 119 having a V-shaped cross section which opens to a sealing surface 113. The lip portion 119 with the V-shaped cross section includes an outwardly directed lip portion 119s which is provided to protrude outwardly in a radial direction from a rim portion of the valve body and an inwardly directed lip portion 119t which is provided to protrude inwardly from the rim portion to a center portion of the valve body. In a state where a pressure is generated in a first surge space 107a, a tip end of the outwardly directed lip portion 119s structuring the V-shaped cross section is pushed to the sealing surface 113 to seal the valve body and the sealing surface 113. In a state where a pressure is generated in a second surge space 107b, a tip end of the inwardly directed lip portion 119t is pushed to the sealing surface 113 to seal the valve body and the sealing surface 113. In consequence, a sealing state is securely attained when the pressure is generated in either surge spaces which are separated via the partition wall.

Notwithstanding, according to the constructions of the fluid control valve disclosed in the Patent reference 1, because the portions structuring the V-shaped cross-section of the lip portion 119 are pressed to the sealing surface 113 simultaneously when the valve body is at the closed position, there is a risk that the lip portion 119 is sucked to the sealing surface 113 due to a vacuum pressure generated in a space S enclosed by the sealing surface 113 and inner side surfaces of the portions structuring the V-shaped cross-section of the lip portion 119. In a case where the lip portion 119 is sucked to the sealing surface 113, there is a risk that a switching of the valve to the open position by the actuator may not be stably performed and/or a drawback, that an actuator generating a greater rotational torque may be required, may be caused.

Further, according to the construction of the fluid control valve disclosed in the Patent reference 1, the portions structuring the V-shaped cross-section of the lip portion 119 is pressed against the sealing surface 113 by the pressure generating either at a first side or a second side of the partition wall when the valve body is at the closed position to be compulsorily deformed to further open a distance of the V-shaped portion. In consequence, a stress is concentrated to a fork portion constructing the V-shaped portion of the lip portion 119 by a pressing force caused by the pressure generated either at the first side or the second side of the partition wall, which may break the fork portion.

A need thus exists for a fluid control valve which is not susceptible to the drawback mentioned above.

SUMMARY

In light of the foregoing, the disclosure provides a fluid control valve, which includes a body forming a fluid passage and including a sealing surface positioned in the fluid passage, a valve body configured to rotate between an open position and closed position within the fluid passage, an elastic sealing member provided at a rim portion of the valve body, and a lip portion extended from the elastic sealing member to be directed towards a center portion of the valve body. The lip portion contacts the sealing surface and a surface of the lip portion facing the sealing surface is exposed to the fluid passage.

According to another aspect of this disclosure, a fluid control valve includes a body forming a fluid passage and including a sealing surface positioned in the fluid passage, a valve body configured to rotate between an open position and closed position within the fluid passage, an elastic sealing member provided at a rim portion of the valve body, and a lip portion extended from the elastic sealing member and configured to contact the sealing surface when the valve body is at the closed position. The lip portion is provided at an outer peripheral surface of the elastic sealing member to incline towards a center portion of the valve body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
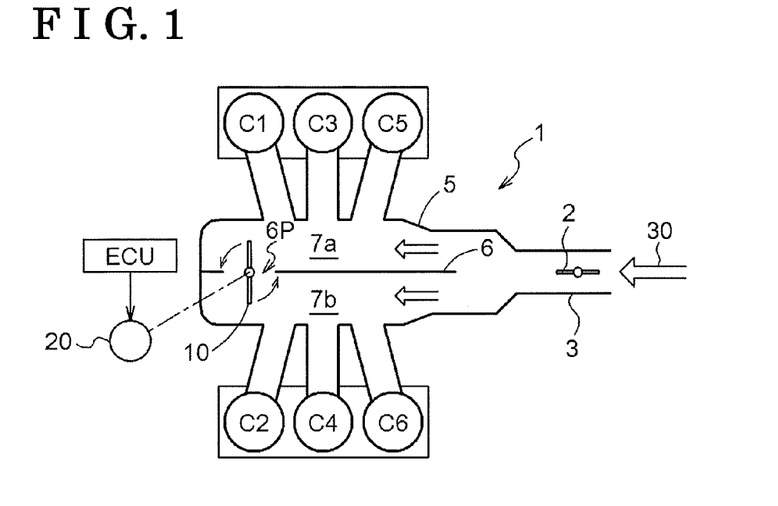
FIG. 1 is a schematic plan view illustrating a surge tank of an engine including a fluid control valve according to embodiments disclosed here.

Embodiments of a fluid control valve will be explained with reference to illustrations of drawing figures as follows. FIG. 1 shows a relationship between an intake system 1 of a V-type six-cylinder engine and six cylinders C1 to C6. The intake system 1 includes an intake passage 3 to which an intake air 30 is supplied via an air filter and a surge tank 5 provided between the intake passage 3 and the cylinders C1 to C6. A throttle valve 2 is provided at the intake passage 3. The surge tank 5 is divided into a first surge chamber 7a and a second surge chamber 7b by a partition wall 6. Odd numbered cylinders C1, C3, C5 are provided extending from the first surge chamber 7a shown in an upper portion in FIG. 1. Even numbered cylinders C2, C4, C6 are provided extending from the second surge chamber 7b shown in a lower portion in FIG. 1.

A portion of the partition wall 6 is open and serves as a fluid passage 6P. A fluid control valve 10 provided at the fluid passage 6P is actuated by an actuator 20 to rotate between an open position and a closed position to change a resonance frequency of the intake system, thus attaining supercharging effects in a wide engine driving range to enhance an engine output. An electric control type actuator which is actuated by an electric signal sent from an electronic control unit (ECU) may be applied as the actuator 20. When the engine is driven in a state where the fluid control valve 10 is at the closed position, an air intake operation is performed by each of the cylinders C1 to C6 in a predetermined order so that a pressure is generated alternately in the first surge chamber 7a and the second surge chamber 7b which are arranged having the partition wall 6 therebetween. If a fluid leaks in a state where the fluid control valve 10 is at the closed position, the intake system 1 cannot attain an expected resonance frequency thus degrading the supercharging effects.

Figure 2:
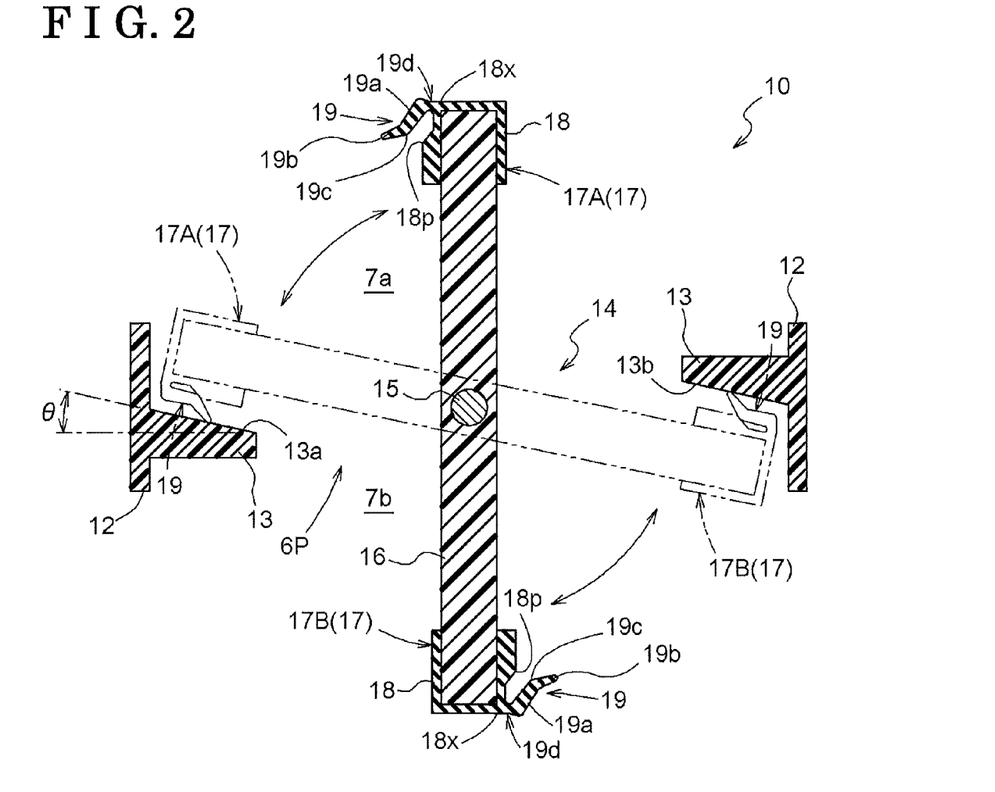
FIG. 2 is a schematic plan view illustrating an open state of the fluid control valve according to a first embodiment disclosed here.

Structures of the fluid control valve will be explained in more details hereinafter. As illustrated in FIG. 2, the fluid control valve 10 includes a body 12 positioned at the fluid passage 6P of the partition wall 6 and a valve body 14 supported by a shaft 15. The shaft 15 is pivotally supported by a part of the body 12. The body 12 is configured to have a window frame shape extending along an entire periphery of an opening of the partition wall 6. A sealing portion 13, which extends in the fluid passage 6P, is formed on an inner surface of the body 12. The sealing portion 13 is formed in an approximately entire periphery of the body 12. A solid line in FIG. 2 shows the open position of the valve body 14 and a two dotted line in FIG. 2 shows the closed position of the valve body 14.

The valve body 14 includes a valve main body 16 made from a resin plate and attached to the shaft 15, and an elastic sealing member 17 made of an elastic member, for example, rubber, and positioned at a rim of the valve main body 16. The elastic sealing member 17 includes a first elastic sealing member 17A positioned at the first surge chamber 7a side and a second elastic sealing member 17B positioned at the second surge chamber 7b side.

Each of the elastic sealing members 17A, 17B includes an attaching portion 18 configured to be outfitted to an outer periphery of the valve main body 16 and a lip portion 19 provided to protrude from a part of a rim portion of the attaching portion 18 to incline towards a center portion of the valve body 14 in a direction to be away from the valve main body 16. The lip portion 19 is provided to protrude from a part of an outer periphery surface of the attaching portion 18 (e.g., a corner portion 18x in an approximately U-shaped cross-section taken along a rotational direction of the valve main body 16) to incline towards the center portion of the valve body 14. In a state where the valve body 14 is at the closed position, the lip portion 19 contacts the sealing portion 13.

The sealing portion 13 includes sealing surfaces 13a, 13b configured to receive the lip portion 19. The sealing surfaces 13a, 13b are formed to have an angle θ relative to an imaginary plane surface which is drawn through the center of the separator partition wall 6. Namely, the sealing surfaces 13a, 13b are inclined surfaces declining from an outer periphery thereof to an inside, that is, the sealing surfaces 13a, 13b gradually decline towards the fluid passage 6P to face the surface of the valve main body 16 when the valve body 14 is closed so that a portion of the sealing surfaces 13a, 13b is positioned closer to the surface chambers 7a, 7b at the opposite sides, respectively, to which the respective sealing surfaces 13a, 13b do not face as a portion of the sealing surfaces 13a, 13b is positioned closer to the center of the valve body 14.

The lip portion 19 includes a base portion 19a formed in a standing manner from the corner portion 18x of the attaching portion 18 towards an inner side of the valve body 14 and a tip end portion 19b formed inclining from an end of the base portion 19a in a direction to be away from the center portion of the valve 14. Thus, the lip portion 19 is shaped in a bent configuration. A protruding portion provided at an intermediate position between the base portion 19a and the tip end portion 19b serves as a first contact portion 19c which is configured to contact a part of the elastic sealing member 17A, 17B after the tip end portion 19b contacts the sealing surfaces 13a, 13b by an operational force of the actuator 20. A bent portion 19d, which has a thinner thickness and is configured to be bent more readily than the base portion 19a, is provided at a portion in the vicinity of a boarder between the base portion 19a and the attaching portion 18. A second contact portion 18p which has a thickness thicker than other portions of the attaching portion 18 is formed on a portion of the attaching portion 18 which faces the lip portion 19. The first contact portion 19c of the lip portion 19 contacts the second contact portion 18p by a reaction force from the sealing surfaces 13a, 13b when the fluid control valve 10 is pressed to the sealing surfaces 13a, 13b by a gas pressure from either one of the first and second surge chambers 7a, 7b in a case where the fluid control valve 10 is at the closed position.

Figure 3:
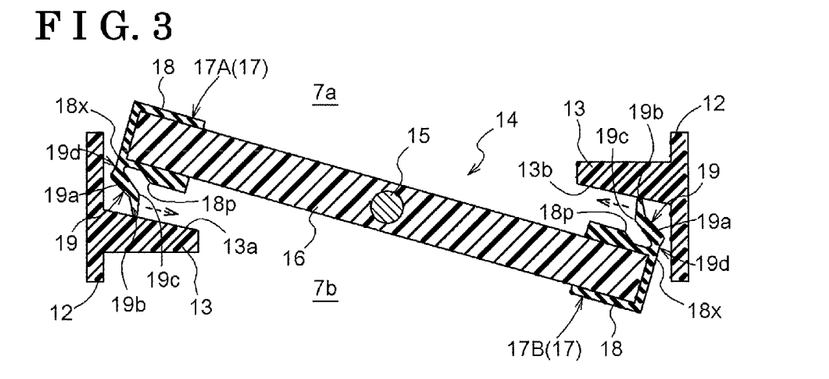
FIG. 3 is schematic plan view illustrating a state of the fluid control valve in the process of an operation to a closed state according to the first embodiment disclosed here.

A switching process to the closed position will be explained hereinafter. When closing the fluid passage 6P, the valve body 14 is rotated in a counterclockwise direction by the actuator 20 to the closed position as indicated with a two-dotted line in FIG. 2. In the process of closing the fluid passage 6P from the open position to the closed position, the fluid passage 6P is assumed to be a state immediately after the tip end of the lip portion 19 starts contacting the sealing surface 13a, 13b (i.e., a contact starting position) as shown in FIG. 3. At the contact starting position, the base portion 19a and the tip end portion 19b are positioned to lean outwardly compared to a vertical direction relative to the sealing surface 13a, 13b. Further, in a case where the lip portion 19 receives an operational force to completely close the valve body 14 to the normal closed position, the bent portion 19d which is adjacent to the base portion 19a is most readily to bent. Accordingly, when the valve body 14 is further rotated in the counterclockwise direction, the tip end portion 19b always moves inwardly towards the center portion of the valve body 14 in a manner declining a slope of the sealing surface 13a, 13b (i.e., arrowed directions in FIG. 3) without displacing outward to the base side of the sealing portion 13. In consequence, the lip portion 19 is bent to rotate about the bent portion 19d in the counterclockwise direction so as to approach the center portion of the valve body 14 by the reaction force that the tip end portion 19b receives from the sealing surface 13a, 13b.

Further, as shown in FIG. 3, in a moment when the tip end portion 19b comes to contact the sealing surface 13a, 13b upon a rotation of the valve in a closing direction (i.e., a counterclockwise direction in FIG. 3), a pressure is applied to the bent portion 19d. Thus, the pressure applied to the bent portion 19d assists the inward movement of the lip portion 19 towards the center portion of the valve body 14. Accordingly, a sealing performance is enhanced by the pressure applied to the bent portion 19d after the tip end portion 19b of the lip portion 19 comes to contact the sealing surface 13a, 13b until a completion of the movement of the valve body 14 to the closed position shown in FIG. 4.

In a case where a level of the pressure in the first surge chamber 7a is higher and a level of the pressure in the second surge chamber 7b is lower during a period after the tip end portion 19b of the lip portion 19 contacts the sealing surface 13a, 13b until the first contact portion 19c comes to contact the second contact portion 18p, the lip portion 19 positioned at a left side in FIG. 3 is pressed by the pressures in a direction that the first contact portion 19c comes to closer to the second contact portion 18p. Simultaneously, in those circumstances, the tip end portion 19b pressed by the pressure is further pressed to the sealing surface 13a by a reaction force when returning to an original shape from an elastically deformed state. Thus, by the reaction force when the tip end portion 19b returns to the original shape from the elastically deformed state, a sealing performance is enhanced during a period after the tip end portion 19b of the lip portion 19 comes to contact the sealing surface 13a until the first contact portion 19c comes to contact the second contact portion 18p. In other case where the lip portion 19 positioned at a right side in FIG. 3 is pressed by the pressures in a direction that the first contact portion 19c in a direction to be away from the second contact portion 18p. Thus, a sealing performance is enhanced.

Figure 4:
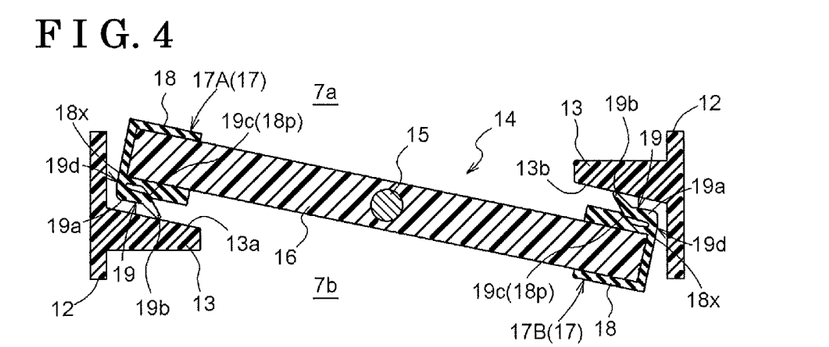
FIG. 4 is a schematic plan view illustrating the closed state of the fluid control valve according to the first embodiment disclosed here.

Accordingly, at the normal closed position, as shown in FIG. 4, the first contact portion 19c of the lip portion 19 is pushed to the second contact portion 18p of the attaching portion 18 by the operational force of the actuator 20 so as to attain a stable state as firmly contact each other and a sealed state where a circulation of a fluid (e.g., gas) between the first surge chamber 7a and the second surge chamber 7b is adequately blocked by the tip end portion 19b which is postured in a state protruding from the firmly contact portion of the first contact portion 19c of the lip portion 19 and the second contact portion 18p of the attaching portion 18. At the normal closed position, the lip portion 19 contacts the sealing portion 13. As described above, with the construction of the fluid control valve 10 of the embodiment, the lip portion 19 is formed to protrude from the corner portion 18x to incline towards the center portion of the valve body 14. In other words, the lip portion 19 is formed to protrude within a width range of the valve main body 16. Accordingly, a surface of the lip portion 19 facing the sealing surface 13a, 13b is exposed to the fluid passage 6P in every closed position including the normal closed position.

Figure 5:
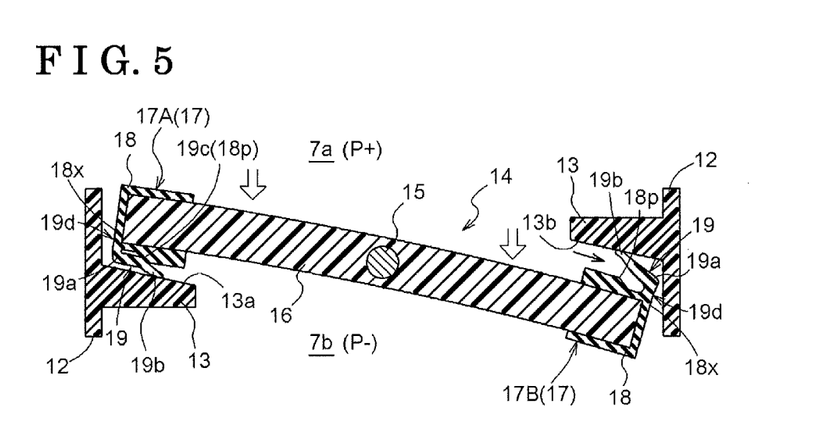
FIG. 5 is a schematic plan view illustrating the fluid control valve in a first state of the closed state.
Figure 6:
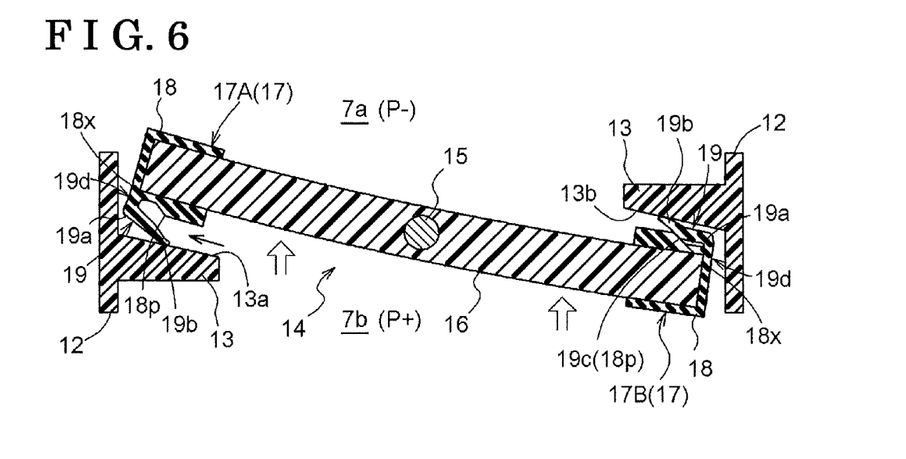
FIG. 6 is a schematic plan view illustrating the fluid control valve in a second state of the closed state.

Upon an engine operation in a state where the fluid control valve 10 seals the fluid passage 6P, the cylinders C1 to C6 sucks air (i.e., performs an intake of the air) in a predetermined order, and the pressure is alternately applied from the first surge chamber 7a and the second surge chamber 7b relative to the fluid control valve 10. FIG. 5 illustrates a state where a gas pressure from the first surge chamber 7a located at an upper portion in FIG. 5 is applied to the fluid control valve 10 (i.e., a first state). FIG. 6 illustrates a state where a gas pressure from the second surge chamber 7b located at a lower portion in FIG. 6 is applied to the fluid control valve 10 (i.e., a second state).

In the first state shown in FIG. 5, the valve main body 16 made from the resin plate which constructs the fluid control valve 10 is elastically deformed in a curved shape arched to protrude in an upward direction in FIG. 5 by the gas pressure. That is, the first elastic sealing member 17A positioned at a left side in FIG. 5 is positioned closer to the sealing surface 13a compared to the state shown in FIG. 4 because of the gas pressure of the first surge chamber 7a. To the contrary, the second elastic sealing member 17B positioned at a right side in FIG. 5 is away from the sealing surface 13b compared to the state shown in FIG. 4 to be closer to the second surge chamber 7b by an elastic deformation of the valve main body 16.

As shown in FIG. 5, as a result of further pressing the lip portion 19 of the first elastic sealing member 17A to the sealing surface 13a compared to the state shown in FIG. 4, the tip end portion 19b protruding from the firmly contact position of the first contact portion 19c and the second contact portion 18p is elastically deformed in a direction so as to be arranged to be close to parallel with the sealing surface 13a compared to the state shown in FIG. 4. That is, the tip end portion 19b contacts the sealing surface 13a via a surface (i.e., hereinafter referred to as the surface contact) in the state shown in FIG. 5 whereas the tip end portion 19b contacts the sealing surface 13a via a line (i.e., hereinafter referred to as the line contact) in the state shown in FIG. 4. Although the dimension of a contacting area with the surface contact in FIG. 5 is greater than the dimension of a contacting area with the line contact in FIG. 4, further secure sealing performance is attained in the state shown in FIG. 5 compared to the state shown in FIG. 4 because of a reaction force of the elastically deformed tip end portion 19b.

On the other hand, the base portion 19a of the lip portion 19 of the second elastic sealing member 17B is restored to a position similar to a case where an external force is not applied thereto, as shown in FIG. 5, because the second elastic sealing member 17B is away from the sealing surface 13b by the elastic deformation of the valve main body 16. However, according to the construction of the embodiment, because the tip end portion 19b is in contact with the sealing surface 13b with adequate force in those circumstances, the gas pressure from the first surge chamber 7a is received by an inner side surface of the lip portion 19 to press a portion close to an apex of the tip end portion 19b to the sealing surface 13b by the gas pressure, thus sufficient sealing state is attained.

As shown in FIG. 6, in a case where the gas pressure is applied to the fluid control valve 10 from the second surge chamber 7b (i.e., the second state), substantially the same effects are attained by the first elastic sealing member 17A, the second elastic sealing member 17B, and the lip portion 19. In those circumstances, because the gas pressure is applied to the fluid control valve 10 from an opposite side relative to the case shown in FIG. 5 where the gas pressure is applied from the first surge chamber 7a, the tip end portion 19b of the second elastic sealing member 17B contacts the sealing surface 13b via a surface (i.e., surface contact) and the base portion 19a of the lip portion 19 of the first elastic sealing member 17A is restored to a position similar to a case where an external force is not applied thereto as shown in FIG. 6. As explained above, a favorable sealing state where the flow of the gas between the first surge chamber 7a and the second surge chamber 7b is sufficiently blocked is attained even when the pressure is applied to the fluid control valve 10 from either sides of the first surge chamber 7a and the second surge chamber 7b.

In a case where a level of the gas pressure from the first surge chamber 7a or the second surge chamber 7b or in a case where an operational force of the actuator 20 is reduced, a displacement of the fluid control valve 10 to the open position is smoothly performed because a restoring force of the tip end portion 19b to elastically return to the state shown in FIG. 4 works effectively.

A second embodiment of the fluid control valve will be explained as follows referring to FIG. 7. Basic constructions of the fluid control valve according to the second embodiment are similar to the first embodiment. Only different constructions of the second embodiment from the first embodiment are explained and the explanations for the common structure will not be repeated.

First, a configuration of the lip portion 19 does not necessarily have the bent configuration having the base portion 19a protruding from the corner portion 18x inwardly to the center portion of the valve body 14 and the tip end portion 19b continued from the end of the base portion 19a to incline in the direction to be away from the center portion of the valve body 14. Alternatively, for example, a lip portion 29 protrudes from the corner portion 18x of the attaching portion 18 towards the center portion of the valve body 14 to have an arched shape whose apex portion is directed to the center portion of the valve body 14 as shown in FIG. 7.

Figure 7:
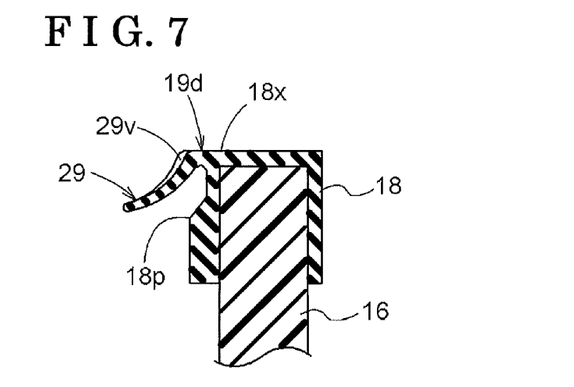
FIG. 7 is a schematic plan view illustrating a main portion of a fluid control valve according to a second embodiment disclosed here.

Second, as illustrated in FIG. 7, a ventilation groove 29v may be provided at a back surface of the lip portion 29 so that the suction is unlikely caused by a negative pressure generated in a space enclosed by the outermost portion of the base portion 19a, the tip end portion 19b, and the sealing surface 13a, 13b when the outermost portion of the base portion 19a and the tip end portion 19b are simultaneously firmly pressed to the sealing surface 13a, 13b by the gas pressure. The ventilation groove 29v may be formed on a back surface of the lip portion 19 disclosed in the first embodiment.

Third, according to the first embodiment, the first contact portion 19c positioned between the base portion 19a and the tip end portion 19b is configured to contact a part of the elastic sealing members 17A, 17B. However, depending on configurations and dimensions of the attaching portion 18, the first contact portion 19c may be configured to contact a part of the valve main body 16 which is made from a resin plate.

The embodiment disclosed here is applicable to a fluid control valve including a body having a fluid passage positioned in an intake system of an automobile and a sealing surface protruding to the fluid passage, a valve body configured to rotate within the fluid passage between an open position and a closed position, and an elastic sealing member positioned at a rim portion of the valve body.

According to the construction of the embodiment, a fluid control valve includes the body 12 forming the fluid passage 6P and including the sealing surface 13a, 13b positioned in the fluid passage 6P, the valve body 14 configured to rotate between an open position and closed position within the fluid passage 6P, the elastic sealing member 17 provided at a rim portion of the valve body 14, and the lip portion 19 extended from the elastic sealing member 17 to be directed towards the center portion of the valve body 14. The lip portion 19 contacts the sealing surface 13a, 13b and a surface of the lip portion 19 facing the sealing surface 13a, 13b is exposed to the fluid passage 6P.

With the construction of the fluid control valve 10 according to the embodiment, when the valve body 14 is at the closed position, the lip portion 19 formed from the rim of the valve body 14 to be directed towards the center portion of the valve body 14 contacts the sealing surface 13a, 13b. In a state where the pressure is generated at a first side of the fluid passage 6P when the valve body 14 is at the closed position, a sealing performance is attained by receiving the pressure of the first side of the fluid passage 6P by an outer surface of the lip portion 19. In a state where the pressure is generated at a second side of the fluid passage 6P when the valve body 14 is at the closed position, a sealing performance is attained by receiving the pressure of the second side of the fluid passage 6P by an inner surface of the lip portion 19. Thus, the valve body 14 and the body 12 are securely sealed when the pressure is applied from either side of the fluid passage 6P when the valve body 14 is at the closed position. Further, because the lip portion 19 is positioned closer to the center portion of the valve body 14 compared to the rim portion of the valve body 14, a length of a circumference of the sealing is shortened and a flow of the air can be effectively blocked even if an operational force retaining the valve body 14 at the closed position is relatively small. Further, the fluid control valve does not include an outwardly extended lip portion which is obvious from a construction that the surface of the lip portion 19 facing the sealing surface 13a, 13b is exposed to the fluid passage 6P at the closed position of the valve body 14, and includes the lip portion 19 inwardly extended from the rim portion of the valve body 14 towards the center portion of the valve body 14. According to this construction, because the lip portion 19 is unlikely sucked to the sealing surface 13a, 13b, a switching operation from the closed position to the open position is smoothly performed with a relatively small operational force. Further, because the lip portion 19 is extended to be directed closer to the center portion of the valve body 19, even if the lip portion 19 is firmly pressed to the sealing surface 13a,13b by the pressure generated at either one of the first and second sides of the fluid passage 6P the lip portion 19 is maintained at a state where the lip portion 19 is positioned between the sealing surface 13a, 13b and the valve body 14. Accordingly, a particular portion of the lip portion 19 is unlikely to be damaged because of an excessive deformation.

According to the construction of the embodiment, the lip portion 19 includes the base portion 19a extended from the elastic sealing member 17 to be directed towards a center portion of the valve body 14 and the tip end portion 19b connected to the base portion and directed to the sealing surface 13a, 13b when the valve body 14 is at the closed position.

According to the construction of the embodiment, compared to a construction in which a lip portion is linearly formed from a base portion to a tip end portion, an angle of the tip end portion 19b of the lip portion 19 relative to the sealing surface 13a, 13b is formed when the valve body 14 is at the closed position. Thus, because the lip portion 19, 29 and the sealing surface 13a, 13b contact each other via a line (i.e., not via a surface) so that a level of pressure applied to the lip portion 19 from the sealing surface 13a, 13b per unit dimension is increased, a fluid unlikely leaks via a clearance between the sealing surface 13a, 13b and the lip portion 19 and a sealing performance is enhanced. In those circumstances, because the tip end portion 19b of the lip portion 19 slides on the sealing surface 13a, 13b more smoothly according to the embodiment in which the lip portion 19, 29 and the sealing surface 13a, 13b contact each other via a line when the valve body 14 changes the position compared to the case where the members lip portion 19, 29 and the sealing surface 13a, 13b contact via a surface, a switching operation to the closed position or a switching operation from the closed position to the open position is smoothly performed.

According to the construction of the embodiment, at least above mentioned tip end portion 19b of the lip portion 19 contacts the sealing surface 13a, 13b when the valve body 14 is at the closed position, and a surface of the base portion 19a facing the sealing surface 13a, 13b is exposed to the fluid passage.

According to the construction of the embodiment, because the surface of the base portion 19a which faces the sealing surface is exposed to the fluid passage 6P, the base portion 19a and the tip end portion 19b simultaneously contact the sealing surface 13a, 13b and a suction of the lip portion 19 to the sealing surface 13a, 13b is unlikely caused due to a generation of a negative pressure in the space enclosed by the base portion 19a, the tip end portion 19b, and the sealing surface 13a, 13b.

According to the construction of the embodiment, the lip portion 19 includes the first contact portion 19c provided between the base portion 19a and the tip end portion 19b and configured to contact with either the elastic sealing member 17 or the valve body 14 in a process after the tip end portion 19b comes to contact the sealing surface 13a, 13b.

According to the construction of the embodiment, when a level of the pressure of the fluid from the fluid passage 6P to the rim portion of the valve body 14 exceeds a predetermined value, the first contact portion 19c provided at a portion between the base portion and the tip end portion comes to contact a portion of the valve body 14 or the elastic sealing member 17. In consequence, the portion substantially serving as an elastic member is limited to a portion ranging from the contact portion to the tip end portion of the lip portion, and thus the sealing performance between the lip portion 19 and the sealing surfaces 13a, 13b is enhanced.

According to the construction of the embodiment, a portion of the elastic sealing member 17 serving as the second contact portion 18p to which the first contact portion 19c is configured to contact is formed to be thicker than other portions of the elastic sealing member.

According to the construction of the embodiment, by supporting the first contact portion 19c provided at the lip portion 19 by the second contact portion 18p having a greater thickness, the base portion 19a and the second contact portion 18p firmly contact each other. Because the tip end portion 19, 29 is securely pressed to the sealing surface 13a, 13b via the firmly contacted portion, sealing performance is enhanced.

According to the construction of the embodiment, a pressure of a fluid from the fluid passage 6P enters a space formed between the second contact portion 18p and the lip portion 19 when the valve body 14 is at the closed position so that the pressure presses the sealing surface 13a, 13b via the lip portion 19.

According to the construction of the embodiment, the base portion 19a includes a bent portion 19d configured to bend for moving the lip portion 19 to be closer to the center portion of the valve body 14 by a reaction force which the tip end portion 19b receives from the sealing surface 13a, 13b.

In a case where a portion of a rim portion of the lip portion 19 is bent in a preceding moment by the reaction force received from a sealing surface or where an intermediate portion between the base portion and the tip end portion is buckled up when the valve body is switched to the closed position, there is a risk that the fluid may leak via a clearance between the lip portion and the sealing surface. According to the construction of the embodiment, however, because an entire rim portion of the lip portion 19 is simultaneously bent by the reaction force received from the sealing surface 13a, 13b, the leakage of the fluid is unlikely caused.

According to the construction of the embodiment, a fluid control valve includes the body 12 forming the fluid passage 6P and including the sealing surface 13a, 13b positioned in the fluid passage 6P, the valve body 14 configured to rotate between an open position and closed position within the fluid passage 6P, the elastic sealing member 17 provided at a rim portion of the valve body 14, and the lip portion 19 extended from the elastic sealing member 17 and configured to contact the sealing surface 13a, 13b when the valve body 14 is at the closed position. The lip portion 19 is provided at an outer peripheral surface of the elastic sealing member to incline towards a center portion of the valve body 14.

According to the construction of the embodiment, when the valve body 14 is at the closed position, the lip portion 19 provided at the outer peripheral surface of the elastic sealing member 17 to incline towards the center portion of the valve body 14 comes to contact the sealing surface 13a, 13b. On the other hand, in a case where one of the first and second sides of the fluid passage 6P is pressurized, a sealing function is performed by receiving the pressure force of the fluid in one of the first and second sides of the fluid passage 6P by an outer surface of the lip portion 19. In a case where the other of the first and second sides of the fluid passage 6P is pressurized, a sealing function is performed by receiving the pressure force of the fluid in the other of the first and second sides of the fluid passage 6P by an inner surface of the lip portion 19. Thus, the valve body 14 and the body 12 are securely sealed when the pressure is applied from either sides of the fluid passage 6P when the valve body 14 is at the closed position. Further, because the tip end portion 19b of the lip portion 19 is positioned closer to the center portion of the valve body 14 relative to the outer peripheral surface of the valve body 14, a circumferential length of the sealing is reduced and a flow of the air can be effectively blocked even if the operational force which retains the valve body 14 at the closed position is relatively small. Further, the fluid control valve does not include an outwardly extended lip portion which is clear from a construction that the lip portion 19 is formed at the outer peripheral surface of the elastic sealing member 17 to incline towards the center portion of the valve body 14 and includes the lip portion 19 inwardly extended from the rim portion of the valve body 14 towards the center portion of the valve body 14. According to this construction, because the lip portion 19 is unlikely to be sucked to the sealing surface 13a, 13b, a switching operation from the closed position to the open position is smoothly performed with a relatively small operational force. Further, because the lip portion 19 is retained at a state being positioned between the sealing surface 13a, 13b and the valve body 14, even if the lip portion 19 is firmly pressed to the sealing surface 13a, 13b by the pressure generated in one of the first and second sides of the fluid passage 6P, a particular portion of the lip portion 19 is unlikely damaged because of an excessive deformation.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A fluid control valve, comprising:
a body forming a fluid passage and including a sealing surface positioned in the fluid passage;
a valve body configured to rotate between an open position and closed position within the fluid passage;
a first elastic sealing member and a second elastic sealing member provided at a rim portion of the valve body;
the first elastic sealing member and the second elastic sealing member each including a lip portion directed towards a center portion of the valve body;
each of the lip portions contacting the sealing surface in the closed position of the valve body, and a surface of each lip portion facing the sealing surface is exposed to the fluid passage;
in a first state of the closed position of the valve body, the lip portion of the first elastic sealing member being pressed against the sealing surface by fluid pressure in the fluid passage acting on one side of the valve body, and the lip portion of the second elastic sealing member being pressed against the sealing surface by the fluid pressure in the fluid passage acting between a first contact portion of the second elastic sealing member and a second contact portion of the second elastic sealing member;
wherein the lip portion of the first elastic sealing member and the lip portion of the second elastic sealing member each includes a base portion extended from the respective elastic sealing member to be directed towards the center portion of the valve body and a tip end portion connected to the base portion and directed to the sealing surface when the valve body is at the closed position; and
wherein the first contact portion is provided between the base portion and the tip end portion and is configured to contact the second contact portion of the second elastic sealing member after the tip end portion contacts the sealing surface in a second state of the closed position of the valve body.

2. The fluid control valve according to claim 1, wherein at least said tip end portion of each lip portion contacts the sealing surface when the valve body is at the closed position, and a surface of each base portion facing the sealing surface is exposed to the fluid passage.

3. The fluid control valve according to claim 2, wherein the second contact portion is thicker than other portions of the second elastic sealing member.

4. The fluid control valve according to claim 1, wherein the second contact portion is thicker than other portions of the second elastic sealing member.

5. The fluid control valve according to claim 3, wherein a pressure of a fluid from the fluid passage enters a space formed between the second contact portion and the lip portion of the second elastic member when the valve body is at the closed position so that the pressure presses the lip portion of the second elastic member onto the sealing surface.

6. The fluid control valve according to claim 4, wherein a pressure of a fluid from the fluid passage enters a space formed between the second contact portion and the lip portion of the second elastic member when the valve body is at the closed position so that the pressure presses the lip portion of the second elastic member onto the sealing surface.

7. The fluid control valve according to claim 1, wherein each base portion includes a bent portion configured to bend for moving each lip portion to be closer to the center portion of the valve body by a reaction force which each tip end portion receives from the sealing surface.

8. The fluid control valve according to claim 2, wherein each base portion includes a bent portion configured to bend for moving each lip portion to be closer to the center portion of the valve body by a reaction force which each tip end portion receives from the sealing surface.

9. The fluid control valve according to claim 3, wherein each base portion includes a bent portion configured to bend for moving each lip portion to be closer to the center portion of the valve body by a reaction force which each tip end portion receives from the sealing surface.

10. The fluid control valve according to claim 4, wherein each base portion includes a bent portion configured to bend for moving each lip portion to be closer to the center portion of the valve body by a reaction force which each tip end portion receives from the sealing surface.

11. The fluid control valve according to claim 5, wherein each base portion includes a bent portion configured to bend for moving each lip portion to be closer to the center portion of the valve body by a reaction force which each tip end portion receives from the sealing surface.

12. The fluid control valve according to claim 6, wherein each base portion includes a bent portion configured to bend for moving each lip portion to be closer to the center portion of the valve body by a reaction force which each tip end portion receives from the sealing surface.

13. A fluid control valve, comprising:
a body forming a fluid passage and including a sealing surface positioned in the fluid passage;
a valve body configured to rotate between an open position and closed position within the fluid passage;
a first elastic sealing member and a second elastic sealing member provided at a rim portion of the valve body;
the first elastic sealing member and the second elastic sealing member each including a lip portion configured to contact the sealing surface when the valve body is at the closed position;
each lip portion is provided at an outer peripheral surface of the respective first and second elastic sealing member to incline towards a center portion of the valve body; and
in a first state of the closed position of the valve body, the lip portion of the first elastic sealing member being pressed against the sealing surface by fluid pressure in the fluid passage acting on one side of the valve body, and the lip portion of the second elastic sealing member being pressed against the sealing surface by the fluid pressure in the fluid passage acting between a first contact portion of the second elastic sealing member and a second contact portion of the second elastic sealing member; and
wherein the first contact portion of the second elastic sealing member is configured to contact the second contact portion comprising a part of the second elastic sealing member after a tip end portion of the second elastic sealing member contacts the sealing surface in a second state of the closed position of the valve.

14. A fluid control valve, comprising:
a body forming a fluid passage and including a sealing surface positioned in the fluid passage;
a valve body configured to rotate between an open position and closed position within the fluid passage, the valve body comprising a valve main body;
the valve body also comprising a first elastic sealing member and a second elastic sealing member each including an attaching portion mounted on an outer periphery of the valve main body and a lip portion configured to contact the sealing surface when the valve body is at the closed position, a surface of each lip portion facing the sealing surface being exposed to the fluid passage, each lip portion being directed towards a center portion of the valve body when the lip portion is spaced from the sealing surface;

in a second state of the closed position of the valve body, the lip portion of the first elastic sealing member being pressed against the sealing surface while a first contact portion and a second contact portion of the first elastic sealing member contact each other when the valve body is moved from the open position to the closed position, the lip portion of the second elastic sealing member being pressed against the sealing surface while a first contact portion and a second contact portion of the second elastic sealing member contact each other when the valve body is moved from the open position to the closed position; and in a first state of the closed position of the valve body, the lip portion of the first elastic sealing member being pressed against the sealing surface by fluid pressure in the fluid passage acting on one side of the valve body in the closed position so that the first contact portion of the first elastic sealing member and the second contact portion of the first elastic sealing member contact each another, and the lip portion of the second elastic sealing member being pressed against the sealing surface by the fluid pressure in the fluid passage acting between and separating the first contact portion of the second elastic sealing member and the second contact portion of the second elastic sealing member while the valve body is in the closed position.

* * * * *